United States Patent [19]

Berardo

[11] 4,444,152

[45] Apr. 24, 1984

[54] DEVICE FOR COLLECTION OF ANIMAL WASTES

[76] Inventor: Carmen R. Berardo, 3185 S. Sydenham St., Philadelphia, Pa. 19145

[21] Appl. No.: 379,660

[22] Filed: May 19, 1982

[51] Int. Cl.³ .............................................. A01K 23/00
[52] U.S. Cl. .................................................... 119/95
[58] Field of Search ............................. 119/95, 143, 1

[56] References Cited

U.S. PATENT DOCUMENTS

| 3,656,459 | 4/1972 | Missud | 119/95 |
| 3,786,787 | 1/1974 | Weinberger | 119/95 |
| 3,817,217 | 6/1974 | Matuka et al. | 119/95 |
| 4,269,148 | 5/1981 | Holley-Donawa | 119/95 |

Primary Examiner—Jay N. Eskovitz
Attorney, Agent, or Firm—Alexis Barron; Richard D. Weber; Peter Y. Lee

[57] ABSTRACT

A device for collecting animal wastes comprising a harness adapted for attachment to the hind quarters of the animal and a collection bag detachably connected to the harness. The fasteners connecting the bag to the harness are of a type permitting the use of any flexible bag and in particular permit the use of inexpensive disposable plastic garbage bags. The preferred form of fastener for securing the bag comprises the loop and stud type fastener commonly used for hosiery garters.

16 Claims, 5 Drawing Figures

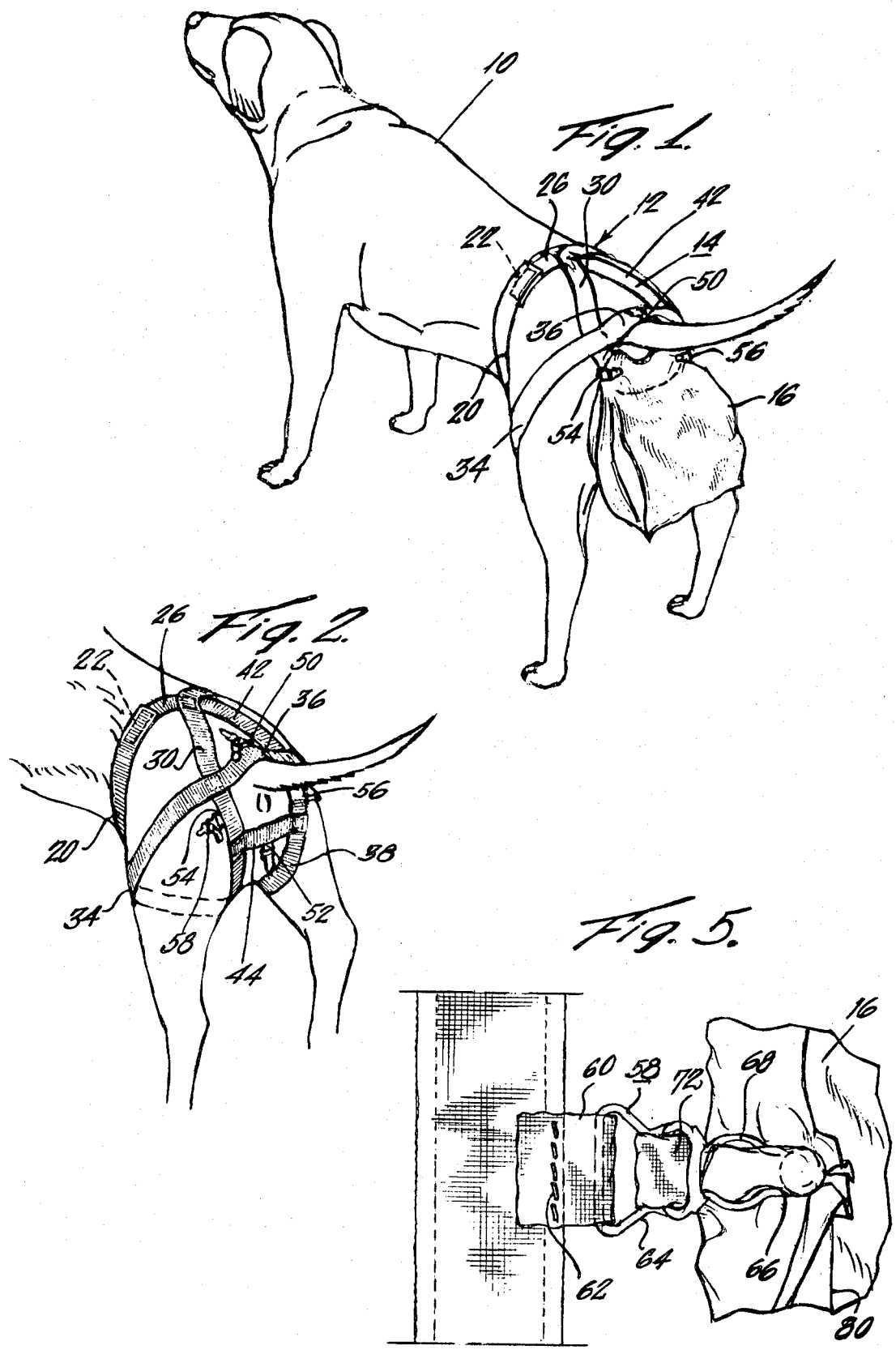

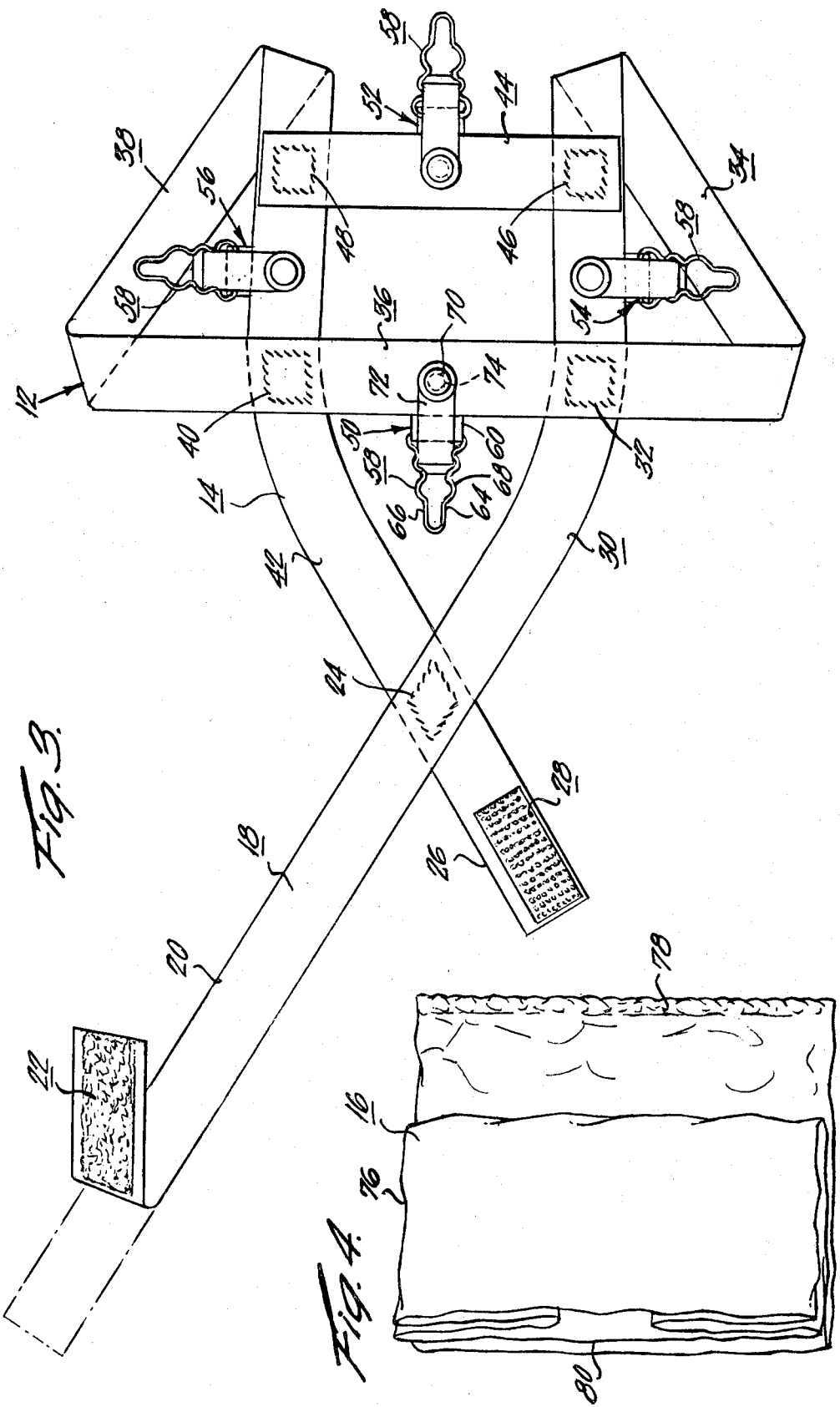

DEVICE FOR COLLECTION OF ANIMAL WASTES

BACKGROUND OF THE INVENTION

The problem of the collection and disposal of animal wastes and particularly those from pet dogs has come under increasing public scrutiny in recent years. In cities and central areas of surburban communities, the problem is especially acute since there are few places where pets can be properly exercised. It is thus still common practice for owners to "walk the dog" on sidewalks. In areas of high population density, animal wastes accumulate on public walkways and park grounds, creating a threat to public health as well as offensive sights and odors. Some cities have passed laws requiring pet owners to clean up wastes deposited by their pets with violators being subject to a heavy fine.

In an effort to alleviate the above problem and to comply with clean up laws, various devices and techniques have been proposed for collecting and disposing of animal wastes. The device most commonly used by dog owners is a small shovel or scoop for picking up the wastes and transferring them into a small container or disposable bag. This method is both inconvenient and unpleasant and makes it necessary for the owner to carefully observe the dog's activities and to carry an implement and a container ready for use. The use of a scoop or shovel has additional shortcomings, particularly in that it is not usually possible to remove all of the wastes from the ground. Furthermore, the scoop or shovel must be cleaned following use if it is to be brought indoors. The difficulties associated with the use of shovel or scoop devices are sufficient to discourage their use.

Another type of device for coping with the problem of animal wastes is worn by the animal and is intended to catch the animal's wastes immediately upon discharge. Such proposed devices typically include a harness which is strapped onto the hind quarters of the animal, and a receptacle designed for attachment to the harness proximate the anal region of the animal. Such a device effectively prevents animal wastes from contacting and soiling the ground or other surface and eliminates offensive sights and odors. The animal owner is spared the need to handle the wastes with shovels or scoops and need not watch the animal's every movement since the time and place of waste elimination are no longer important.

The harness and receptacle type of device, although proposed long ago, has not become popular with pet owners and its use has been limited principally to larger animals such as horses in special situations, such as horse-drawn cart rides through city parks. Although there are obvious advantages to the harness and receptacle type of devices, it is believed that their use has been restricted by the cost of producing the special receptacles which have characterized proposed devices. Examples of different types of harnesses and receptacles are shown in U.S. Pat. Nos. 2,585,251, 3,786,787, 3,818,217, and 4,095,562.

Although several of the above patents describe the receptacles as being disposable, the receptacles in each instance are of a special construction customized to cooperate with a particular harness construction. The previously proposed receptacles furthermore typically include either snap fasteners, adhesive portions, or hook and loop type fastening strips, which make the receptacles expensive to manufacture. The complicated structures of the previously proposed devices and the resultant expense of their manufacture are considered to be principally responsible for the failure of the devices to attain any significant degree of popularity.

SUMMARY OF THE INVENTION

The present invention provides a device for collecting animal wastes which, although of the harness and receptacle type, employs a conventional small plastic garbage bag as the disposable receptacle. The harness, which is preferably formed of elastic webbing, and which in a preferred embodiment includes a waistband as well as leg loops, defines a plurality of attachment points for the bag spaced peripherally around the anus of the animal. Selectively releasable attachment means secured to the harness at the attachment points secure the open end of the bag in a position encircling the anal region of the animal. In a preferred form of the invention, the attachment means comprise loop and stud type fasteners which can readily be attached and detached from the open edge of the bag. In a preferred arrangement, the harness supports four such fasteners located above, below and to each side of the anus of the animal.

It is accordingly a first object of the present invention to provide a device for the collection of animal wastes of the harness and receptacle type wherein the receptacle comprises a conventional plastic garbage bag.

An additional object of the invention is to provide a device as described which is completely effective in collecting animal wastes in a clean, convenient manner.

Still another object of the invention is to provide a device as described, the harness of which can be easily attached to and removed from the animal.

A still further object of the invention is to provide a device as described having a simple arrangement for attaching the receptacle to the harness.

A further object of the invention is to provide a device as described which causes no discomfort or distress to the animal.

Another object of the invention is to provide a device as described of a simple, inexpensive construction and which will fit animals of a variety of sizes.

BRIEF DESCRIPTION OF THE DRAWINGS

FIG. 1 is a perspective view of a dog wearing a collection device in accordance with the present invention;

FIG. 2 is a perspective view of the hind quarters of the dog of FIG. 1, with the collection bag removed from the device to show details of the bag supporting harness assembly;

FIG. 3 is an enlarged plan view of the harness assembly of the collection device of FIG. 1 as it would appear laid out on a flat surface;

FIG. 4 is an enlarged perspective view of the collection bag of the FIG. 1 embodiment; and FIG. 5 is an enlarged view of a portion of the device of FIG. 1 showing the manner of attachment of the collection bag to the harness assembly.

DESCRIPTION OF THE PREFERRED EMBODIMENT

Referring to the drawings and particularly FIG. 1 thereof, a dog 10 is shown wearing a device 12 for collection of animal waste in accordance with the present invention. The device 12 includes a harness assembly 14 and a collection bag 16 demountably attached to the harness 14. The harness 14 includes attachment means for supporting the collection bag 16 so that the open end of the bag is held in an open position around the anus of the animal to collect the wastes emanating therefrom. Details of the harness assembly, attachment means and the bag may be gained from the enlarged views of FIGS. 3-5.

With reference to FIG. 3, the harness assembly 14 is formed of two strips of webbing, which is preferably an elastic webbing to readily adapt to movements of the animal. Considering the longer strip of webbing 18 and starting with the left hand side of FIG. 3, the webbing strip 18 defines in a first portion a waistband 20 provided on the underside of its free end with a length 22 of hooked plastic material comprising one element of a Velcro fastener. At its opposite end, the waistband 20 is sewn at 24 in overlapping fashion to the opposite end of the webbing strip 18, establishing a short free end 26 thereof on the upper side of which is attached a length of looped plastic material 28 of the Velcro type adapted for cooperative fastening attachment with the hooked material 22.

The continuation of the waistband 20 to the right of the stitching 24 defines a first top strap 30 and is then formed in a loop by stitching at 32 to form a first leg loop 34. The webbing strip 18 continues in a transverse tail strap 36 and then into a second leg loop 38 which is secured by stitching 40. From the second leg loop the webbing element continues in a second top strap 42 to the stitched area 24 and the short free end 26.

A second short webbing strip 44 joins the leg loop 34 with the leg loop 38, being attached respectively thereto by stitchings 46 and 48. The strip 44 is disposed in spaced parallel relation to the tail strip 36, the spacing being sufficient to accommodate both the tail and the anal region of the animal.

The attachment of the harness to an animal such as a dog is quite simple. The left hind leg of the dog is placed through the leg loop 34 and the right hind leg of the dog through the leg loop 38 with the dog's tail passing through the opening formed between the two leg loops and the tail strip 36 and webbing strip 44. As shown in FIG. 2, the waistband 20 is then wrapped around the dog's waist and the Velcro fastening elements 22 and 28 engaged to secure the harness in place. The top straps 30 and 42 will then lie along the upper surface of the rump of the dog.

The primary function of the harness is to provide collection bag fastening points spaced peripherally around the anal region of the dog, at which attachment points the collection bag fastening means can be secured. Although the number of fastening points and fastening means could be varied, at least three are required to hold the bag in an open condition and four are preferred as illustrated.

In the present embodiment, attachment points 50, 52, 54 and 56 for attachment of the fastening means are respectively provided on the tail strap 36, webbing strip 44, leg loop 34 and leg loop 38. These attachment points are located at substantially 90° intervals around the perimeter of the anal region of the animal.

The attachment means for securing the collection bag 16 to the harness at each of the aforesaid attachment points comprises a loop and stud fastener assembly 58 which is secured to the harness by a short loop 60 of webbing material by stitching at 62 (FIG. 5). The loop and stud fastener assembly 58 is of a conventional type most commonly used in hosiery garters and includes a wire frame member 64, the outer end 66 of which is formed in a narrow parallel walled loop which opens inwardly into an enlarged region 68. A resilient stud 70 is attached to the free end of a cloth retaining strip 72, the inner end of which is secured to the fastener frame member 64. The stud 70 is of essentially cylindrical shape and of a diameter permitting entrance into the enlarged region 68 of the fastener but too large to pass into the loop 66. An annular groove 74 in the stud 70 permits the sliding entrance of the stud into the loop 66 after the stud has first been inserted into the enlarged region 68. The stud can only be removed from the loop after it has been moved back to the enlarged region 68.

As shown in FIGS. 2 and 3, one of the fastener assemblies 58 is attached to the harness at each of the attachment points 50, 52, 54 and 56. As shown in FIG. 2, this provides bag fastening means on the harness at points spaced above, below and to each side of the anus of the animal.

The collection bag 16 comprises a flexible plastic bag, preferably of the gusseted type. Such bags are sold as kitchen scrap or garbage bags, are widely available in a variety of sizes and are quite inexpensive. The size found suitable for the average size dog measures approximately six and a half inches by eleven inches.

As shown in FIG. 4, plastic bags of this type typically comprise a tubular plastic body section 76 which is transversely heat sealed at 78 to close one end and is cut at the opposite end 80 to form a smooth continuous bag edge. Since bags of this type are made of relatively thin plastic, for example, 0.8 mil, it is preferred that the bag edge be folded over as shown in FIG. 5 to provide a double thickness of material for attachment of the fasteners 58. The bag is connected to a fastener by placing the doubled edge over the stud, inserting the stud in the enlarged fastener region 68, and sliding the stud into the loop 66. The bag is detached from the fastener by sliding the stud into the enlarged region and then removing the stud from the frame.

Although the bag may be attached to the harness before or after attachment of the harness to the dog, it is usually simpler to attach the bag before the harness is secured to the dog. It may be desirable to leave the top fastener unattached while putting the harness on the dog since the dog's tail must pass between the bag and the tail strap 36. The upper fastener can then be attached to the bag on one side of the tail.

After the dog has exercised, the bag and harness can be quickly removed as a unit by releasing the Velcro fastener members 22 and 28 and pulling the harness rearwardly and downwardly to allow the dog to step out of the leg loops 34 and 38. The bag can then be separated from the harness by opening the fasteners 58. The bag may be sealed as desired, for example by means of wire or plastic bag ties, prior to disposal.

Although a plastic bag is preferred as a collection receptacle, in an emergency, an ordinary paper bag would prove serviceable with the present invention although it would require extra care in handling. Since paper bags tend to lose their strength when wet, the plastic bags are much preferred, particularly since odors are virtually eliminated with the plastic bag. Plastic coated paper bags could also be used with the present invention; however, their increased cost would not make them as attractive as the preferred plastic bags.

Although the invention can be used with other types of animals, it is primarily intended for use with dogs. Dogs are admirably clean animals in carrying out the elimination function and this helps to assure a complete recovery of the wastes by the collection bag. Tests utilizing the present device have been completely successful in obtaining a clean collection of all of the animal's wastes.

The webbing strips 18 and 44 are preferably of elastic textile webbing as are the loops 60 securing the fasteners to the webbing strips. The connection of the webbing strips at their various overlapped joints is preferably effected by stitching because of its strength, ease of fabrication, and absence of protrusions which might prove bothersome or injurious to the animal. Alternate methods of attachment of the webbing strips could also be employed, however, including riveting, adhesive bonding, combinations of these methods with stitching, or any other means of attachment having sufficient strength to secure the strips in the disclosed relationship.

I claim:

1. A device for collecting animal wastes comprising harness means adapted for attachment to an animal, said harness means including harness members disposed adjacent the anal region of the animal including a tail strap disposed so as to pass above the tail of the animal, said harness means establishing a plurality of attachment points around the periphery of the anal region of the animal including an attachment point on said tail strap near the anal region of the animal, and attachment means secured to said harness at each of said attachment points, said attachment means comprising independently attachable and releasable fastener assemblies for positive connection to any selected point along the continuous open edge of an imperforate garbage bag of thin plastic material, one of said fastener assemblies being secured to said tail strap at said attachment point near the anal region of the animal, thereby permitting attachment of the bag to the harness with the open edge of the bag encircling the anal region of the animal.

2. The invention as claimed in claim 1 wherein said attachment means comprises a loop and stud type fastener.

3. The invention as claimed in claim 1 wherein said attachment points are spaced at substantially uniform intervals around the anal region of the animal.

4. The invention as claimed in claim 1 comprising at least three of said attachment points.

5. The invention as claimed in claim 1 comprising four said attachment points, one above, one below and one at each side of the anal region of said animal.

6. A device for collecting animal wastes comprising harness means adapted for attachment to an animal, said harness means including harness members disposed adjacent the anal region of the animal including a tail strap disposed so as to pass above the tail of the animal, said harness means establishing a plurality of attachment points around the periphery of the anal region of the animal including an attachment point on said tail strap near the anal region of the animal, a collection bag comprising an imperforate garbage bag of thin plastic material, and attachment means secured to said harness at each of said attachment points, said attachment means comprising independently attachable and releasable fastener assemblies adapted for positive connection to any selected point along the continuous open edge of said bag, one of said fastener assemblies being secured to said tail strap at said attachment point near the anal region of the animal, thereby permitting attachment of the bag to the harness with the open edge of the bag encircling the anal region of the animal.

7. The invention as claimed in claim 6 wherein said attachment means comprises a loop and stud type fastener.

8. The invention as claimed in claim 6 wherein said attachment points are spaced at substantially uniform intervals around the anal region of the animal.

9. The invention as claimed in claim 6 comprising at least three of said attachment points.

10. The invention as claimed in claim 6 comprising four said attachment points, one above, one below and one at each side of the anal region of said animal.

11. A device for collecting animal wastes comprising harness means adapted for attachment to an animal, said harness means comprising webbing strips forming a waistband, a pair of leg loops, a top strap connecting each of said leg loops with said waistband, a tail strap connecting said leg loops, said tail strap being disposed so as to pass above the tail of the animal, a webbing strip connecting said leg loops and disposed beneath the anal region of the animal, said tail strap, webbing strip, and portions of said leg loops establishing a plurality of attachment points around the periphery of the anal region of the animal including an attachment point on said tail strap near the anal region of the animal, a collection bag comprising an imperforate garbage bag of thin plastic material, and attachment means secured to said harness at each of said attachment points, said attachment means comprising independently attachable and releasable fastener assemblies adapted for positive connection to any selected point along the continuous open edge of said bag, one of said fastener assemblies being secured to said tail strap at said attachment point near the anal region of the animal, thereby permitting attachment of the bag to the harness with the open edge of the bag encircling the anal region of the animal.

12. The invention as claimed in claim 11 wherein said attachment means comprises a loop and stud type fastener.

13. The invention as claimed in claim 11 wherein said attachment points are spaced at substantially uniform intervals around the anal region of the animal.

14. The invention as claimed in claim 11 comprising four said attachment points, one above, one below and one at each side of the anal region of said animal.

15. The invention as claimed in claim 11 wherein said waistband is detachable to permit application and removal of the harness from an animal.

16. The invention as claimed in claim 11 wherein said harness webbing strips are elastic.

* * * * *